United States Patent [19]

Palazzetti et al.

[11] 4,287,881

[45] Sep. 8, 1981

[54] SOLAR ENERGY ABSORBER FOR USE WITH A LINEAR OPTICAL CONCENTRATING SYSTEM

[75] Inventors: Mario Palazzetti, Avigliana; Angioletta Boero, Turin; Francesca Demichelis, Turin; Enrica Minetti-Mezzetti, Turin, all of Italy

[73] Assignee: Centro Ricerche Fiat S.p.A., Orbassano, Italy

[21] Appl. No.: 119,603

[22] Filed: Feb. 7, 1980

[30] Foreign Application Priority Data

Feb. 20, 1979 [IT] Italy .............................. 67372 A/79

[51] Int. Cl.³ ............................................... F24J 3/02
[52] U.S. Cl. .................................... 126/440; 126/446; 126/439; 126/417; 126/450
[58] Field of Search ............... 126/417, 429, 431, 432, 126/438, 440, 441, 442, 445, 446, 449, 450, 439; 165/179, 48 S

[56] References Cited

U.S. PATENT DOCUMENTS

| 3,089,670 | 5/1963 | Johnson | 126/441 |
| 4,090,495 | 5/1978 | Lesk | 126/438 |
| 4,117,829 | 10/1978 | Gross et al. | 126/438 |
| 4,120,286 | 10/1978 | Farber | 126/441 |

FOREIGN PATENT DOCUMENTS

| 2412908 | 10/1975 | Fed. Rep. of Germany | 126/440 |
| 555420 | 3/1923 | France | 126/440 |
| 2373018 | 8/1978 | France | 126/440 |

Primary Examiner—Larry Jones
Attorney, Agent, or Firm—Sughrue, Mion, Zinn, Macpeak & Seas

[57] ABSTRACT

A solar energy absorber comprises a thermally-insulated duct housing a plurality of longitudinally-extending absorbing plates and having a slit located at the focal axis of an elongate, optical focusing system. The plates are parallel to the plane of symmetry of the optical system and are spaced apart such that focused energy incident through the slit falls upon an entire surface of each plate, any reflected energy being returned to the plates by a plane mirror located on the opposite side of the plates from the slit and by internal reflecting surfaces of the duct such that substantially all the energy is absorbed: this energy is given up to an air flow through the duct, in use.

7 Claims, 2 Drawing Figures

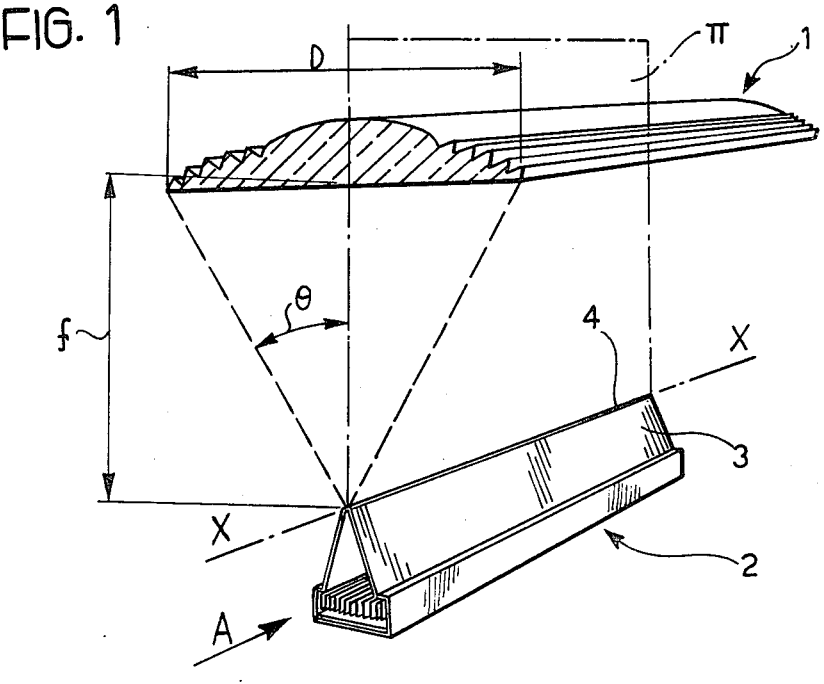
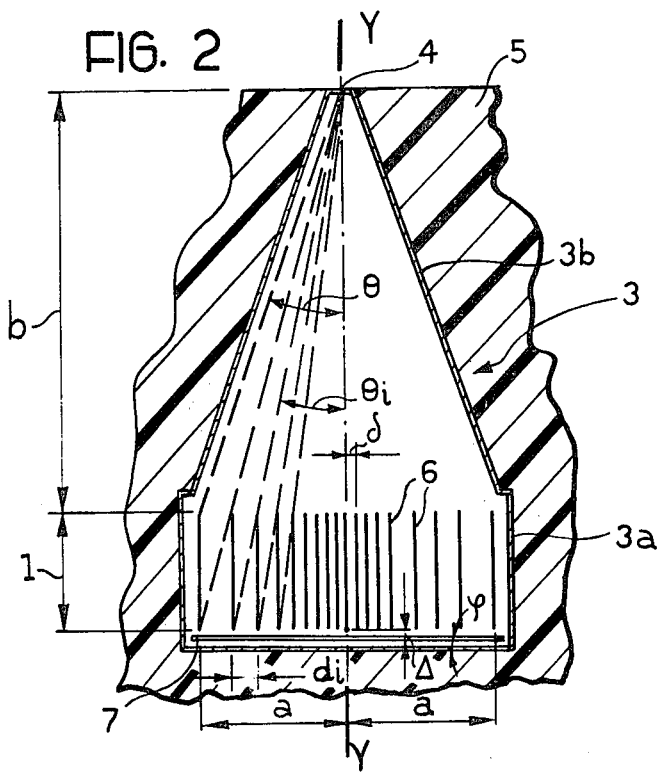

SOLAR ENERGY ABSORBER FOR USE WITH A LINEAR OPTICAL CONCENTRATING SYSTEM

BACKGROUND OF THE INVENTION

The present invention relates to a solar energy absorber for use with a linear optical concentrating system, that is, an optical system which focuses radiant energy at a focal axis, and to solar energy absorption apparatus incorporating such an absorber combined with such an optical concentrating system.

Solar energy absorbers associated with linear optical concentrating systems generally consist of a cylindrical tube disposed along the focal axis of the optical concentrating system and carrying a fluid flow which takes up energy absorbed by the tube in the form of heat. The outer surface of the cylindrical tube is usually covered with a black film to improve the absorbing characteristics of the tube and to reduce infra-red emmission and the tube is generally housed within a glass casing to limit heat loss by radiation. A space is also left between the cylindrical tube and the glass casing in which a steady vacuum is formed to limit heat losses by convection and conduction.

Solar energy absorbers of the cylindrical-tube type described above have various disadvantages and, more particularly:

(a) heat losses by conduction, convection and radiation increase with increase in temperature of the absorbing tube and the heat exchange conditions between the tube and the fluid passing therethrough deteriorate along the tube in the direction of flow. Thus the heat yield to the fluid decreases along the tube in the direction of the fluid flow therethrough.

(b) the methods used in making this type of solar energy absorber are becoming more and more difficult and costly.

(c) the black films currently in use will not withstand temperatures greater than 300°C. Their properties deteriorate after a given number of thermal cycles resulting in particularly burdensome problems of maintenance. Furthermore, it is very difficult to achieve uniform deposition of the film in the first instance.

(d) infra-red radiation emitted by the cylindrical tube is absorbed by the glass casing and results in heat loss by convection since the glass casing is in direct contact with the surrounding air. The use of dichroic deposits on the glass casing to reduce radiation reflection in the visible range and to increase it in the infra-red range is being studied, but here one is dealing with techniques which are difficult, costly and usable in practice only for small casings.

(e) given the usual dimensions of the cylindrical absorbing tube, it is extremely difficult to achieve a steady vacuum between the cylindrical tube and the glass casing which will limit the heat loss effectively.

SUMMARY OF THE INVENTION

An object of the present invention is to provide a solar energy absorber for use with a linear optical concentrating system which overcomes at least some of the disadvantages described above and which, in particular, is technically simple to produce.

According to the present invention there is provided a solar energy absorber for use with an optical system for focusing radiant energy at a focal axis, comprising a duct having reflecting internal wall surfaces and a longitudinally extending slit for location at the focal axis of the optical system to allow passage of radiant energy focused by the optical system into the duct, a plurality of parallel, spaced-apart plates extending longitudinally within the duct, arranged to receive directly radiation passing through the slit and adapted to absorb the radiation as heat, a reflective surface extending longitudinally of the duct on the opposite side of the plates from the slit, the said surface being arranged to reflect radiation incident in a direction parallel to the plates onto the plates, and the duct being adapted to receive an air-flow therethrough to take up heat from the plates.

A solar energy absorber according to the present invention thus allows radiant energy focused at a focal axis by a suitable optical system to be trapped within the duct by the absorbing plates. The energy absorber would be located, in use, with the slit at the focal axis of the optical system and the absorbing plates arranged parallel to the plane of symmetry of the optical system. The absorbing plates are preferably spaced from each other such that the radiant energy is incident directly on the entire surface of one face of each plate.

The solar energy according to the present invention is technically much more simple to make than the cylindrical-tube-type absorbers and has much smaller power losses. In particular, given the structure of the absorber according to the invention, it is not necessary for the absorbing plates to be coated with a black film.

In a preferred embodiment of the invention the duct has an outer jacket of thermally insulating material, the jacket preferably increasing in thickness along the duct in the direction of the fluid flow therethrough, in use, so as to ensure that the heat yield to the air flow is substantially constant along the entire length of the duct.

The reflective surface arranged to direct radiation incident in a direction parallel to the plates onto the plates may, for example, be a curved mirror but preferably comprises a plane mirror inclined to the plates themselves.

According to a further aspect of the invention there is provided solar energy absorption apparatus comprising an optical system for focusing radiant energy at a focal axis, in combination with a solar energy absorber as described above arranged with said slit at the focal axis of the optical system and with the said plates arranged parallel to a plane of symmetry of the optical system.

BRIEF DESCRIPTION OF THE DRAWINGS

One embodiment of the invention will now be more particularly described, by way of example, with reference to the accompanying drawings, in which:

FIG. 1 is a diagrammatic perspective view of solar energy absorption apparatus according to the present invention, and FIG. 2 is a cross sectional view of an absorber forming part of the apparatus of FIG. 1, on an enlarged scale.

DESCRIPTION OF THE PREFERRED EMBODIMENTS

Referring to FIG. 1 of the drawings, solar energy absorption apparatus according to the invention is shown including an optical system, generally indicated 1, for focusing radiant energy at a focal axis X—X. In this embodiment the optical system comprises a Fresnel lens but it may alternatively comprise a cylindrical lens, or a plurality of spherical lenses may be located in a line so as to concentrate radiant energy at discrete points along the focal axis.

The absorption apparatus further includes a solar energy absorber according to the present invention indicated in its entirety as 2, the dimensions of the absorber being enlarged compared with those of the optical system 1 for reasons of clarity.

The absorber 2 comprises a duct 3 defined by walls having reflecting internal surfaces, the duct being symmetrical about a longitudinal plane of symmetry coincident with a plane of symmetry $\pi$ of the lens 1 passing through a focal axis X—X.

As best seen in FIG. 2, the duct 3 has a rectangular channel-section portion 3a and two inclined walls 3b, joined each along one longitudinal edge to the free edge of a respective side wall of the portion 3a. The walls 3b are inclined towards each other and have closely-spaced free edges which define between them a slit 4 located at the focal axis X—X of the lens 1. The slit 4 thus allows radiation focused at the axis X—X by the lens 1, in use, to pass into the duct 3.

The duct 3 is provided with an outer jacket 5 of insulating material which is partially illustrated in FIG. 2. It is also provided, within the channel-section portion 3a, with a plurality of similar, spaced-apart plates 6, which extend longitudinally thereof, parallel to the plane of symmetry $\pi$ and which are adapted to absorb the radiant energy which passes into the duct 3 through the slit 4. The plates 6 may, for example, be made from burnished steel.

The relative size and disposition of the various parts of the apparatus will now be described in greater detail.

Referring to FIG. 1, the cross-sectional aperture of the optical system 1 is indicated as D and the focal length of the system in the plane of symmetry $\pi$, that is, the distance between the focal axis X—X and the optical system 1, is indicated as f. The half-aperture angle of the rays focused at the focal axis X—X of the optical system 1 is indicated by $\theta$.

In FIG. 2, the trace, in the plane of this Figure, of the plane of symmetry $\pi$ of the optical system 1 is shown as Y—Y. The distance between the axis Y—Y and the absorbing plate 6 which is furthest from this axis is indicated by a. The distance between the upper edges of the plates 6 and the slit 4, taken along the axis Y—Y, is indicated as b. The distances a and b are such as to allow the plates 6 to capture all the radiant energy which enters the duct 3 through the slit 4. More particularly, a and b are related by the equation:

$$a = (Db/2f)$$

Furthermore, the spacing $d_i$ between each pair of adjacent plates 6 is such that none of the plates shades an adjacent plate from direct radiation from the slit 4; thus the spacing $d_i$ of the pairs of adjacent plates varies, and is calculated for each pair by the formula:

$$d_i = l\, tg\theta_i$$

where l is the height of the plates 6 parallel to the trace Y—Y and where $\theta_i$ is the half-aperture angle of the rays which are incident on the upper edge of that plate 6 of a pair of adjacent plates 6 under consideration, which is closest to the axis Y—Y.

The duct 3 also houses a longitudinally-extending, plane mirror 7 in the base of the channel-section portion 3a, on the opposite side of the plates 6 from the slit 4.

The mirror 7 is inclined at an anle $\phi$ to a plane perpendicular to the plane of symmetry of the optical system 1. The angle $\phi$ is chosen so as to prevent radiant energy which is incident directly on the mirror 7 adjacent the plane of symmetry $\pi$ of this optical system 1 from being reflected outside the duct 3 through the slit 4. The mirror 7 is in fact inclined so as to reflect this portion of the radiant energy on to one of the plates 6 which is located adjacent the plane of symmetry $\pi$ and hence the angle $\phi$ is determined by the equation:

$$\phi = \arctan \delta/2(l + \Delta)$$

where $\Delta$ is the distance between the mirror 7 and the adjacent edge of one of the plates 6 adjacent the plane of symmetry $\pi$, and $\delta$ is the perpendicular distance between the axis Y—Y and the said one plate 6.

The apparatus being made in accordance with the principles described above, radiant energy focused by the optical system 1 at the focal axis X—X and entering the duct 3 through the slit 4 is incident directly on the entirety of one face of each of the plates 6. These plates absorb the greater part of this energy and any small portion of the energy which is reflected is returned to the plates 6 by the mirror 7. The reflecting wall surfaces of the duct 3 also reflect energy incident on them to the plates 6 such that substantially all the radiant energy which enters the duct 3 is trapped and absorbed by the plates 6.

In the use of the apparatus, air is passed through the duct 3 in the direction of arrow A in FIG. 1 and flows over the plates 6 to take up the absorbed energy therefrom in the form of heat. It is found that the difference in temperature between the plates 6 and the air in each conduit formed between two adjacent plates 6 is extremely small but it is advisable to regulate the air flow in these conduits to avoid the creation of "hot spots" which might occur due to the differing spacings of the plates. The duct 3, however, remains, at substantially ambient temperature.

A particular embodiment of the absorption apparatus described above has the following dimensions and characteristics:

Optical system 1
 a cylindrical Fresnel lens having;
 length = 1 meter;
 aperture D = 60 cm;
 focal length f = 80 cm.

Solar energy absorber 2
 a plurality of burnished-steel plates 6 each having;
 thickness = 0.8 mm
 height l = 3 cm.
 distance b = 10.7 cm.
 thickness of outer jacket 5 = 5 cm.
 a mirror 7 of specular sheet steel.

In use of the above apparatus of focus solar energy, with a through-flow of air of 150 kg/h, it was found that a rise of temperature of the air by 20 C. degrees could be obtained, starting with air at 20° C., and a usable power of 200 cal/sec could be generated. Clearly, any number of similar pieces of apparatus could be placed in series to generate further usable power, or apparatus using longer lenses 1 and corresponding absorbers 2 may be used. In fact, apparatus including a lens 1 having a length of 25 meters has allowed air temperatures of the order of 500° C. to be achieved. Apparatus employing a long optical system 1, and correspondingly long duct 3, with a consequent high rise in temperature of the air flow, is also subject to progressively higher heat losses along the duct 3, in the direction A of the air flow, by conduction through the thermally-insulating jacket 5. For this reason, the thickness of the jacket 5 is progressively increased, in the direction of air flow, in apparatus according to the present having a considerable length, so as to ensure that this loss by conduction is substantially constant along the entire length of the duct 3.

In practice the energy losses of the absorption apparatus described above are much smaller than those which occur in apparatus including cylindrical-tube-type absorbers. More particularly, the energy losses which may occur in the absorber according to the invention are attributable essentially to three different factors:

(a) loss by reflection of radiant energy which is incident on the outer walls of the duct 3 adjacent the slit 4. This loss may be reduced, in the embodiment illustrated, to a magnitude of the order of 1% of the incident radiation, by treating the surfaces adjacent the slit 4 to make them anti-reflecting.

(b) loss of heat through the slit 4 by means of the air above the absorber. In the case illustrated, for differences of temperature of the order of 200° C., this loss is less than 1 cal/sec.

(c) loss of energy by conduction through the outer jacket 5. For a rise in air temperature of 200° C., the loss due to this factor is less than 10 cal/sec.

Thus there may be a substantially constant loss of energy of the order of 7% along the entire length of the duct 3.

What is claimed is:

1. A solar energy absorber for use with an optical system for focusing radiant energy at a focal axis, comprising;

a peripheral wall defining a duct and a longitudinally extending slit for location at said focal axis to allow passage of said radiant energy focused by said optical system into said duct, said peripheral wall having a reflective internal surface;

a plurality of parallel, spaced-apart plates extending longitudinally within said duct, arranged to receive directly said radiant energy passing through said slit and adapted to absorb said radiant energy as heat;

a reflective surface extending longitudinally of said duct on the opposite side of said plates from said slit and being arranged to reflect radiant energy incident in a direction parallel to said plates onto said plates; and said duct having an air-flow therethrough to take up heat from said plates in use of the absorber.

2. A solar energy absorber as in claim 1, wherein said reflective surface is planar.

3. A solar energy absorber as in claim 1, wherein said peripheral wall is provided with an outer jacket of thermally-insulating material.

4. A solar energy absorber as in claim 3, wherein the thickness of said outer jacket increases along said duct in the direction of said air-flow therethrough, in use.

5. A solar energy absorber as in any preceding claim, wherein said plates are spaced from each other such that said radiant energy is incident directly on the entire surface of one face of each said plate.

6. A solar energy absorber as in claim 1, wherein said peripheral wall has a longitudinally-extending wall portion defining a rectangular-section channel-portion of said duct and two planar, inclined wall portions joined each along a longitudinal edge to a respective free edge of said wall portion defining said channel portion, said inclined wall portions converging to two closely-spaced longitudinal edges which define said slit, and wherein said plurality of parallel, spaced apart plates are located within said channel portion of said duct.

7. Solar energy absorption apparatus comprising, in combination:

an optical system for focusing radiant energy at a focal axis, said optical system having a plane of symmetry; and a solar energy absorber comprising;

a peripheral wall defining a duct and a longitudinally extending slit at said focal axis to allow passage of said radiant energy focused by said optical system into said duct, said peripheral wall having a reflective internal surface, a plurality of spaced-apart plates extending longitudinally within said duct parallel to said plane of symmetry of said optical system, said plates being arranged to receive directly said radiant energy passing through said slit and being adapted to absorb said radiant energy as heat;

a reflective surface extending longitudinally of said duct on the opposite side of said plates from said slit and being arranged to reflect radiant energy incident in a direction parallel to said plates; and said duct having an air-flow therethrough to take up heat from said plates in use of said absorption apparatus.

* * * * *